(12) United States Patent
Magalingam Adithyan et al.

(10) Patent No.: US 11,827,085 B2
(45) Date of Patent: Nov. 28, 2023

(54) ELECTRIC TRANSMISSION ASSEMBLY INCLUDING HYDRODYNAMIC BEARING

(71) Applicant: Schaeffler Technologies AG & Co. KG, Herzogenaurach (DE)

(72) Inventors: Arjun Kailassh Magalingam Adithyan, Charlotte, NC (US); Matthew Frary, Sterling, OH (US); Jitesh Modi, Rochester Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 118 days.

(21) Appl. No.: 17/398,512

(22) Filed: Aug. 10, 2021

(65) Prior Publication Data
US 2022/0048374 A1 Feb. 17, 2022

Related U.S. Application Data

(60) Provisional application No. 63/064,436, filed on Aug. 12, 2020.

(51) Int. Cl.
*F16H 57/02* (2012.01)
*B60K 1/00* (2006.01)
(Continued)

(52) U.S. Cl.
CPC ............ *B60K 1/00* (2013.01); *F16C 32/0629* (2013.01); *F16C 32/0662* (2013.01);
(Continued)

(58) Field of Classification Search
None
See application file for complete search history.

(56) References Cited

U.S. PATENT DOCUMENTS 3,033,623 A * 5/1962 Thomson ................ F16C 33/20
384/911
5,145,265 A * 9/1992 Flem ........................ F16C 33/20
384/296
(Continued)

FOREIGN PATENT DOCUMENTS

CN 2551800 Y * 5/2003
CN 202165436 U * 3/2012 .............. F16C 17/02
(Continued)

OTHER PUBLICATIONS

CN 109578432 B1 translation (Year: 2019).*
(Continued)

*Primary Examiner* — Justin Holmes
(74) *Attorney, Agent, or Firm* — Volpe Koenig

(57) ABSTRACT

In one aspect, an improved electric transmission assembly is provided that includes a hydrodynamic bearing. The electric transmission assembly includes a stator arranged inside of an outer housing. A rotor is configured to be rotatably driven by the stator. The rotor can include a rotor shaft having a first gear configured to driveably engage with a differential. A hydrodynamic bearing is arranged between the rotor shaft and the outer housing. The hydrodynamic bearing is formed from a non-conductive material. Specifically, the hydrodynamic bearing can be formed from a polymeric or plastic material. In one aspect, the hydrodynamic bearing is formed from a non-metallic material.

19 Claims, 11 Drawing Sheets

(51) Int. Cl.

| | |
|---|---|
| *F16H 57/037* | (2012.01) |
| *H02K 5/167* | (2006.01) |
| *H02K 7/08* | (2006.01) |
| *H02K 7/116* | (2006.01) |
| *F16C 32/06* | (2006.01) |
| *H02K 7/00* | (2006.01) |

(52) U.S. Cl.
CPC ......... *F16H 57/037* (2013.01); *H02K 5/1672* (2013.01); *H02K 7/006* (2013.01); *H02K 7/083* (2013.01); *H02K 7/116* (2013.01); *B60K 2001/001* (2013.01); *F16H 2057/02034* (2013.01); *F16H 2057/02052* (2013.01)

(56) References Cited

U.S. PATENT DOCUMENTS

| | | | | |
|---|---|---|---|---|
| 5,509,738 | A  * | 4/1996 | Haynes | F16C 17/10 |
| | | | | 384/909 |
| 6,307,293 | B1 | 10/2001 | Ichiyama | |
| 6,509,668 | B2 * | 1/2003 | Berger | H02K 1/30 |
| | | | | 310/422 |
| 6,674,213 | B2 * | 1/2004 | Berger | H02K 3/487 |
| | | | | 310/90 |
| 7,665,954 | B2 * | 2/2010 | Ide | F16C 33/12 |
| | | | | 415/104 |
| 7,884,511 | B2 * | 2/2011 | Mogi | F16H 57/0476 |
| | | | | 310/63 |
| 8,128,289 | B2 | 3/2012 | Yamamoto | |
| 9,941,771 | B2 | 4/2018 | Garrard | |
| 10,093,163 | B2 | 10/2018 | Schmitt et al. | |
| 10,378,641 | B2 * | 8/2019 | Nakano | F16H 48/40 |
| 10,823,276 | B2 * | 11/2020 | Francis | F16H 48/06 |
| 11,054,019 | B2 * | 7/2021 | Lamm | F16H 57/0483 |
| 11,318,835 | B2 * | 5/2022 | Lamm | F16H 57/037 |
| 2002/0074880 | A1 | 6/2002 | Tae Young | |
| 2004/0163409 | A1 | 8/2004 | Nakajima et al. | |
| 2006/0147135 | A1 | 7/2006 | Kim | |
| 2007/0292060 | A1 | 10/2007 | Kusaka et al. | |
| 2012/0171017 | A1 | 7/2012 | Norem et al. | |

FOREIGN PATENT DOCUMENTS

| | | | | |
|---|---|---|---|---|
| CN | 202867577 U | * | 4/2013 | ............. F16C 35/00 |
| CN | 109578432 B | * | 3/2021 | ............. F04D 25/06 |
| CN | 107620768 B | * | 5/2021 | ............. F16C 17/02 |
| DE | 3830386 A1 | * | 3/1990 | |
| DE | 20302174 U1 | * | 10/2004 | ............. F16C 19/06 |
| DE | 202011100921 U1 | * | 10/2012 | ............. F16C 33/201 |
| DE | 102011121935 A1 | * | 6/2013 | ............. F16C 17/02 |
| DE | 102012214850 A1 | * | 3/2014 | ............. F16C 27/063 |
| DE | 202019106330 U1 | * | 4/2021 | |
| EP | 551550 A1 | * | 7/1993 | ............. F04D 29/026 |
| FR | 2803450 A1 | * | 7/2001 | ............... H02K 1/30 |
| JP | H074380 A | * | 1/1995 | |
| JP | 2001157405 A | * | 6/2001 | ............. F16C 17/04 |
| JP | 2003-322098 A | | 11/2003 | |
| JP | 2020514645 A | * | 5/2020 | |
| WO | WO-0135515 A1 | * | 5/2001 | ............. F16C 27/02 |
| WO | WO-2004109105 A2 | * | 12/2004 | ......... F04D 29/0413 |
| WO | 2012-062851 A1 | | 5/2012 | |
| WO | WO-2013007136 A1 | * | 1/2013 | ............. F16C 17/02 |
| WO | WO-2014139623 A1 | * | 9/2014 | ............. F04D 13/021 |
| WO | WO-2020064489 A1 | * | 4/2020 | ............. F16C 25/02 |
| WO | WO-2020064796 A1 | * | 4/2020 | ............. B62D 1/181 |

OTHER PUBLICATIONS

CN 107620768 B1 translation (Year: 2019).*
CN 202867577 U1 translation (Year: 2019).*
CN 202165436 U1 translation (Year: 2019).*
DE 102012214850 A1 translation (Year: 2019).*
DE 202011100921 U1 translation (Year: 2020).*
DE 202019106330 U1 translation (Year: 2020).*
DE 3830386 A1 translation (Year: 2019).*
WO 2020064489 A1 translation (Year: 2020).*
EP 551550 A1 translation (Year: 2019).*
FR 2803450 A1 translation (Year: 2019).*
JP 2001157405 A1 translation (Year: 2001).*
CN 2551800 Y1 translation (Year: 2019).*
DE 102011121935 A1 translation (Year: 2019).*
JP 2020514645 A1 translation (Year: 2020).*
WO 2013007136 A1 translation (Year: 2014).*
WO 2014139623 A1 translation (Year: 2015).*
WO 2020064796 A1 translation (Year: 2020).*
U.S. Appl. No. 16/807,882, filed Mar. 3, 2020 (unpublished).

* cited by examiner

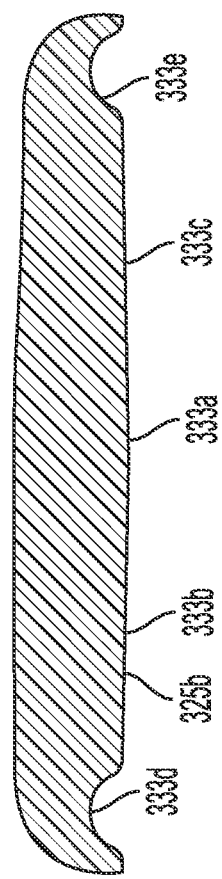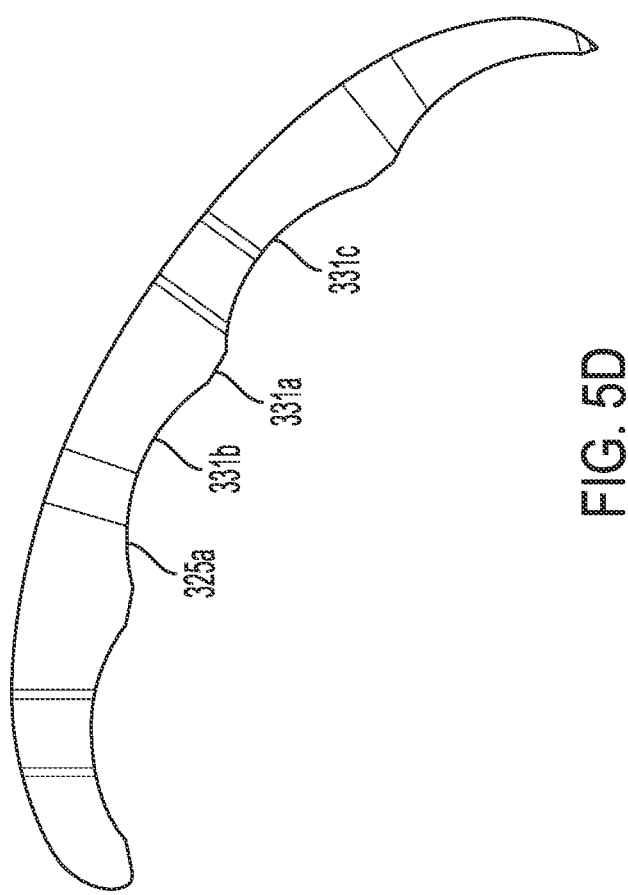

ELECTRIC TRANSMISSION ASSEMBLY INCLUDING HYDRODYNAMIC BEARING

INCORPORATION BY REFERENCE

This application claims priority to U.S. Provisional Application No. 63/064,436, which was filed on Aug. 12, 2020, and is incorporated herein by reference in its entirety.

FIELD OF INVENTION

The present disclosure is directed to an electric transmission assembly, and is more particularly related to providing hydrodynamic bearings for the electric transmission assembly.

BACKGROUND

It is well known that automotive transmissions are generally used to route power from an internal combustion engine (ICE) to vehicle wheels, while adjusting a speed ratio between the wheels and the ICE to ensure that the ICE operates efficiently. As there is a growing demand to make vehicles more fuel efficient, some vehicles now utilize electric motors to supplement or replace the ICE.

Automotive transmissions typically contain a number of shafts that rotate relative to a fixed housing. In some arrangements, the shafts may be configured to rotate relative to one another. Bearings are utilized to permit relative rotation while minimizing any drag torque. The bearings are generally designed to transfer forces between components with relative rotation. It is well known to use radial bearings for transmitting any radial loads, and to use axial bearings or thrust bearings for transmitting any axial loads. Combination bearings are also known, and are generally configured to transmit or support both radial and axial loads.

Roller bearings, which include a rolling element supported between opposing rings, are also often used in automotive transmissions. The rolling elements are primarily configured to maintain rolling contact, as opposed to sliding contact, with the bearing rings. Bushings, which can also be used in automotive transmissions, are another type of bearing which utilize predominantly sliding contact and typically are formed from materials with a low coefficient of friction to minimize drag.

While these various bearing types are known, they also suffer from deficiencies. For example, electric static can build up during running and these types of bearings can be subject to electric currents passing through them. This typically causes damage to bearing surfaces and therefore causes the bearings to prematurely fail. One known solution for addressing the electrical current problem is to use insulation coatings, or other types of shunts to help prevent passage of current through the bearings. These solutions are typically labor intensive to install or expensive.

Accordingly, it would be desirable to provide an improved solution for addressing the electric current issues for bearings that are implemented in electric motor assemblies.

SUMMARY

In one aspect, an improved electric transmission assembly is provided that includes a hydrodynamic bearing. The electric transmission assembly includes a stator arranged inside of an outer housing. A rotor is configured to be rotatably driven by the stator. The rotor can include a rotor shaft having a first gear configured to driveably engage with a differential. A hydrodynamic bearing is arranged between the rotor shaft and the outer housing. The hydrodynamic bearing is formed from a non-conductive material. Specifically, the hydrodynamic bearing can be formed from a polymeric or plastic material. In one aspect, the hydrodynamic bearing is formed from a non-metallic material.

The hydrodynamic bearing can include a first hydrodynamic bearing at a first axial end of the rotor, and a second hydrodynamic bearing at a second axial end of the rotor. The first hydrodynamic bearing can be configured to engage a central housing of the outer housing, and the second hydrodynamic bearing can be configured to engage with a first end cap of the outer housing. The hydrodynamic bearings can either be press-fit onto the relative housing components or can be fixedly connected via mating features to be rotationally locked or fixed to the stationary housing components.

The hydrodynamic bearing can include a radially extending flange defining a first bearing surface and an axially extending flange defining a second bearing surface. The radially extending flange and the axially extending flange can be integrally formed with each other. In another aspect, the radially extending flange and the axially extending flange can be formed separately from each other.

The hydrodynamic bearing can include an anti-rotation element configured to rotationally fix the hydrodynamic bearing to another component of the transmission, such as the outer housing.

The hydrodynamic bearing, in one aspect, a bearing surface on at least one of a radial bearing surface or an axial bearing surface having a profile including a flat section with groove sections on either end of the flat section. In another aspect, the hydrodynamic bearing can include a bearing surface on at least one of a radial bearing surface or an axial bearing surface having a profile comprising a flat section with ramped sections on either end of the flat section, and groove sections on respective ends of the ramped sections.

The differential can be configured to engage a first output shaft and a second output shaft, and the first output shaft and the second output shaft can each be configured to drive a vehicle wheel.

In one aspect, the rotor shaft includes a central cavity dimensioned to receive at least one of the first output shaft or the second output shaft therein.

The first gear can be configured to engage with a second gear connected to a countershaft, and the countershaft can include a third gear configured to engage with a fourth gear connected to the differential. The countershaft can be arranged offset from the rotor shaft and along a parallel axis to an axis of the rotor shaft. The countershaft can be arranged radially outward from the differential.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 5C is a magnified view of a portion of an axial bearing surface of the hydrodynamic bearing of FIGS. 5A and 5B.

FIG. 5D is a magnified view of a portion of a radial bearing surface of the hydrodynamic bearing of FIGS. 5A-5C.

DETAILED DESCRIPTION OF THE PREFERRED EMBODIMENTS

Figure 1A:
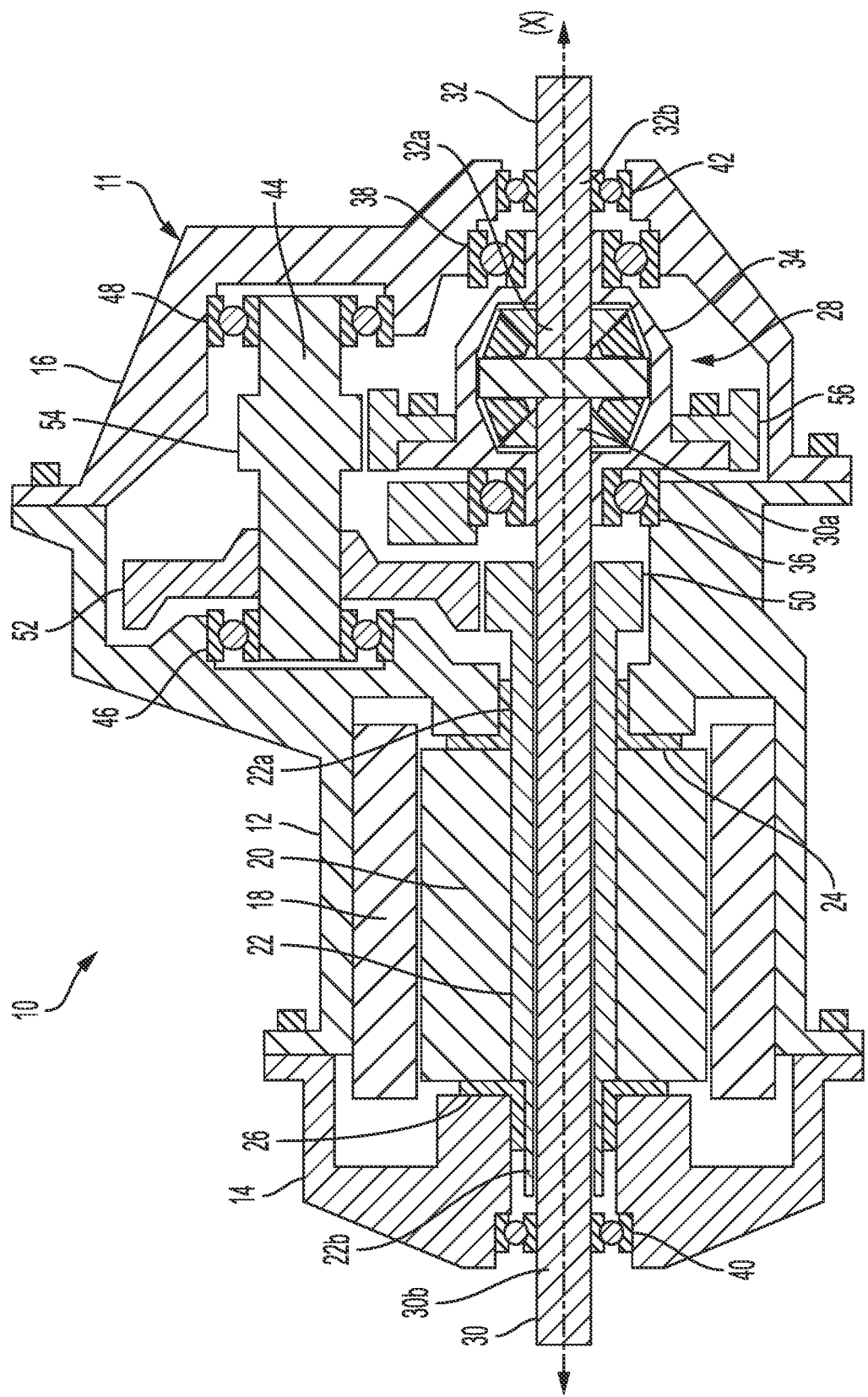
FIG. 1A is a side cross-sectional view of a transmission according to one aspect including a combined radial bearing component and axial or thrust bearing component.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1A, 1B, 2, and 5E, a transmission 10 for an automotive or vehicle assembly is generally disclosed herein. In one aspect, the automotive transmission 10 is an electric transmission. The transmission 10 includes an outer housing 11 that generally encloses all of the internal components of the transmission 10, such as a stator 18, rotor 20, differential 28, etc. The outer housing 11 can be formed from multiple components or elements, or can be formed as a single unitary housing element. In one aspect, the outer housing 11 can be formed via a central housing 12, a first end cap 14, and a second end cap 16. One of ordinary skill in the art would understand that fewer or additional components can be used to form the outer housing 11. The central housing 12, the first end cap 14, and the second end cap 16 can be attached to each other via various fastening arrangements. For example, the central housing 12, the first end cap 14, and the second end cap 16 can be bolted together after installation of internal components.

An electric motor is integrated with the transmission 10 and is configured to generate power. In one aspect, the electric motor includes a stator 18. The stator 18 can be fixed to another component of the transmission 10. The stator 18 can be fixed to an interior surface of one of the central housing 12, the first end cap 14, or the second end cap 16. In one aspect, the stator 18 is fixed to the central housing 12.

The electric motor also includes a rotor 20. The rotor 20 can be arranged radially inward or outward of the stator 18. The rotor 20 is generally configured or support to rotate. In one aspect, the rotor 20 is fixed to a rotor shaft 22. Although a separate rotor shaft 22 is shown in the Figures, one of ordinary skill in the art would understand that in other aspects, the rotor shaft 22 could be formed integrally with the rotor 20.

The rotor shaft 22 can include a central cavity, as described in further detail herein. A first end 22a of rotor shaft 22 is configured to be supported for rotation relative to the central housing 12 via at least one first bearing support. In one aspect, the first bearing support comprises a first hydrodynamic bearing 24. A second, opposite end 22b of the rotor shaft 22 is supported for rotation relative to the first end cap 14 via at least one second bearing support. The second bearing support can comprise a second hydrodynamic bearing 26.

In one aspect, the electric motor is generally provided at one axial end of the transmission 10. At another axial end of the transmission 10, a differential 28 can be provided. The differential 28 can be configured to divide or split power output to a first output shaft 30 and a second output shaft 32. The differential 28 is generally driven by the rotor shaft 22, through a series of connections or gears which are described in more detail herein. The first and second output shafts 30, 32 can be configured to transmit power or output to a respective wheel of the vehicle. The differential 28 can be a bevel gear differential, in one aspect. One of ordinary skill in the art would understand that alternative types of differentials can be used. In one example, either one of the output shafts 30, 32 may terminate with a constant velocity joint to connect to a half-shaft that connects to a wheel unit.

The differential 28 and the first and second output shafts 30, 32 are configured to be supported for rotation about the same axis, i.e. axis (X), as the rotor 20. The first output shaft 30 is configured to extend through the central cavity of the rotor shaft 22. The differential 28 can include a carrier 34 that provides a radially outer housing or component. Bearings 36 and 38 are provided between the carrier 34 and the outer housing 11, i.e. the carrier 12 and the second end cap 16. The first output shaft 30 is supported at a first end 30a by the differential 28 and at a second end 30b by bearing 40. Similarly, the second output shaft 32 is supported at a first end 32a by differential 28 and at a second end 32b by a bearing 42.

A countershaft 44 can be provided that is arranged inside of the outer housing 11 of the transmission 10. The countershaft 44 is arranged offset from the axis (X). An axis of the countershaft 44 is parallel to the axis (X). The countershaft 44 is rotatably supported by a pair of bearings 46 and 48 arranged on axially opposite ends of the countershaft 44. The countershaft 44 can be arranged radially outward from the differential 28. This arrangement provides an axially compact transmission 10.

In one aspect, a first gear 50 is connected to the rotor shaft 22. The first gear 50 can be formed integrally with the rotor shaft 22. In one aspect, the first gear 50 is attached to the first end 22a of the rotor shaft 22. The first gear 50 is configured to mesh, i.e. drivingly engage, with a second gear 52 which is connected to the countershaft 44. The second gear 52 can be formed integrally with the countershaft 44 in one aspect. A third gear 54 is connected to the countershaft 44. In one aspect, the third gear 54 is integrally formed into countershaft 44. The third gear 54 is configured to mesh with a fourth gear 56. In one aspect, the fourth gear 56 is connected to the carrier 34 of the differential 28. The fourth gear 56 could be formed directly on a radially outer surface of the carrier 34.

The rotor shaft 22, the countershaft 44, and the first, second, third, and fourth gears 50, 52, 54, and 54 are configured to driveably connect the rotor 20 to the differential 28. These components and the differential 28 driveably connect the rotor 20 to the first and second output shafts 30, 32.

As used in this disclosure, components are considered to be driveably connected if power is transmitted between them. As used in this disclosure, driveably connected components may directly interact or engage, or may indirectly interact or engage and be connected via intermediate components. Components may be selectively driveably connected by releasable power flow components such as clutches or brakes.

Figure 1B:
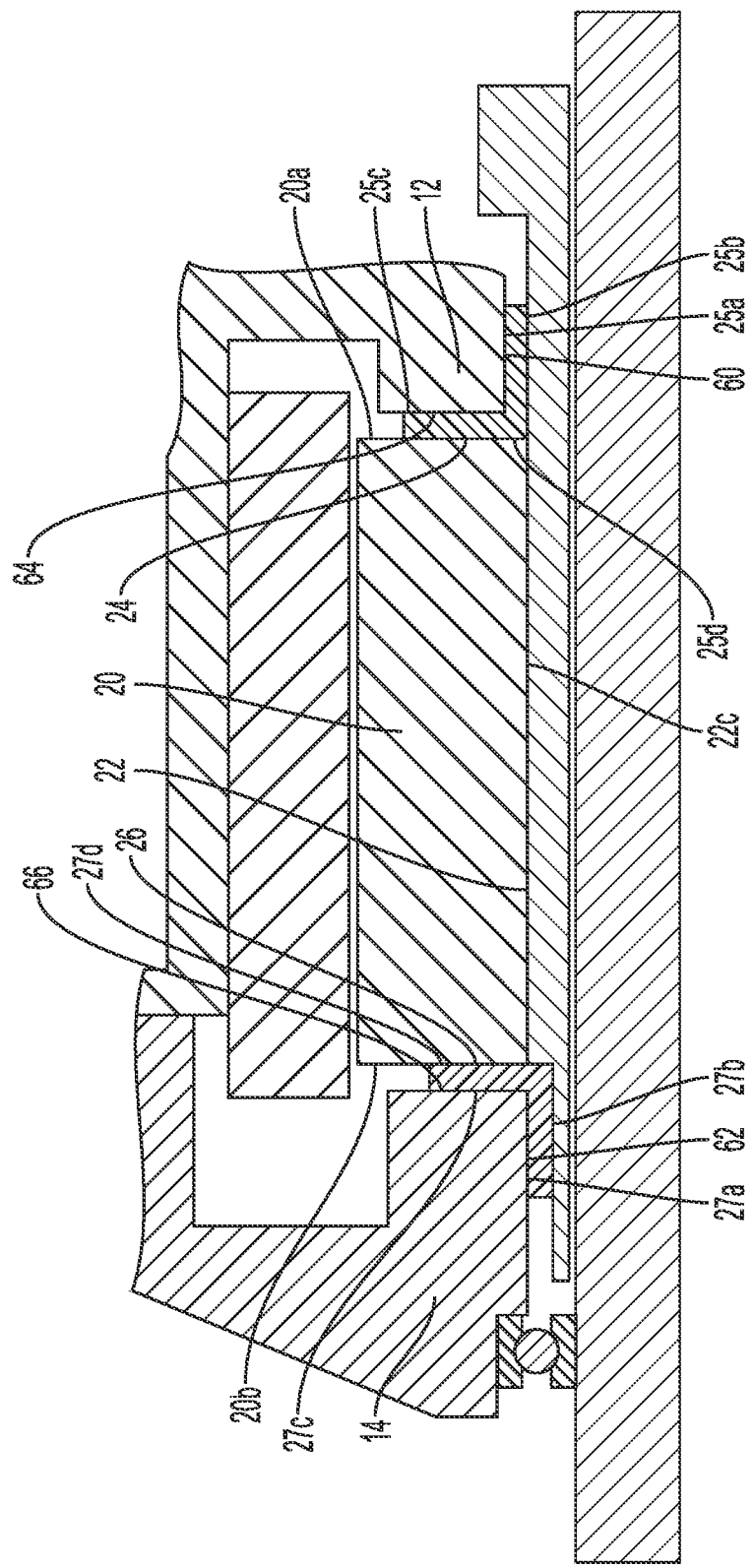
FIG. 1B is a magnified side cross-sectional view of the transmission of FIG. 1A.

FIG. 1B is a magnified view of one aspect of the interface between the rotor shaft 22 and the surrounding components. An outer radial surface 25a of the first hydrodynamic bearing 24 is configured to engage or interface with a radial support surface 60 of the central housing 12. An inner radial surface 25b of the first hydrodynamic bearing 24 is configured to engage or interface with a radial surface 22c of the rotor shaft 22.

An outer radial surface 27a of the second hydrodynamic bearing 26 is configured to engage or interface with a radial support surface 62 of the first end cap 14. An inner radial surface 27b of the second hydrodynamic bearing 26 is configured to engage or interface with the radial surface 22c of the support shaft 22.

An outer axial surface 25c of the first hydrodynamic bearing 24 is configured to engage a corresponding axial end face 64 of the central housing 12. An inner axial surface 25d of the first hydrodynamic bearing 24 is configured to engage a corresponding axial end face 20a of the rotor 20.

An outer axial surface 27c of the second hydrodynamic bearing 26 is configured to engage a corresponding axial end face 66 of the first end cap 14. An inner axial surface 27d of the second hydrodynamic bearing 26 is configured to engage a corresponding axial end face 20b of the rotor 20.

Fluid, such as lubricating fluid, is directed or routed between the interfaces between the hydrodynamic bearings 24, 26 and the rotor 20 and the rotor shaft 22. Grooved surfaces, which are described in more detail herein, are provided on the surfaces of the hydrodynamic bearings 24, 26 facing or engaging the rotor 20 and the rotor shaft 22. In particular, the inner axial surface 25d and the inner radial surface 25b of the first hydrodynamic bearing 24, and the inner axial surface 27d and the inner radial surface 27b of the second hydrodynamic bearing 26 include hydrodynamic bearing surfaces that are generally configured to direct or route fluid, such as lubricating fluid. In one aspect, fluid can be supplied from an external cooled reservoir and/or pump system, or a recirculating cooled oil bath system utilizing the volume of oil in the transmission assembly.

Features on these surfaces distribute the fluid into a film in response to relative rotation. For example, the direction of relative rotation can be clockwise or counterclockwise based on the forward or reverse driving mode. In one aspect, the film separates the surfaces so that friction is minimized. Both axial and radial forces may be transmitted. Exemplary designs, features, bearing profiles, and other aspects of a hydrodynamic bearing are disclosed in U.S. patent application Ser. No. 16/807,882, filed on Mar. 3, 2020, which was filed by the Applicant. U.S. patent application Ser. No. 16/807,882, filed on Mar. 3, 2020, which was filed by the Applicant, is hereby incorporated by reference herein in its entirety.

In one aspect, the hydrodynamic bearings 24, 26 are fixed to the outer housing 11, such as the central housing 12, or the first end cap 14, and the hydrodynamic film may be formed between the hydrodynamic bearing 24, 26 and at least one of the rotor 20 or the rotor shaft 22. One of ordinary skill in the art would understand that in an alternative configuration or assembly, the hydrodynamic bearings may be fixed to the rotor 20 and/or the rotor shaft 22.

The hydrodynamic bearings can include anti-rotation elements, such as elements 129, 229, 429 shown in FIGS. 3A-3C, 4A-4C, and 6A, respectively. One of ordinary skill in the art would understand that the anti-rotation elements can include any type of flange, protrusion, or other structure that is configured to engage with corresponding mating feature formed on another component of the transmission 10, such as the outer housing 11. In another aspect, the anti-rotation elements could be formed as a receptacle that is dimensioned to receive a protruding structure formed on another component of the transmission 10.

During operation, shaft voltages and the current generated by the motor can be dissipated through conventional bearing rolling elements to the outer housing. This may result in arcing which degrades the tribological characteristics of the bearing surface and rolling elements, and degrades the material microstructure thereby causing premature failure of bearings. To address these issues, the first and second hydrodynamic bearings 24 and 26 may be formed from a non-conductive material, such as a polymeric material or plastic material, that is not affected or impacted by electrical potential. In one aspect, the non-conductive material can include high performance thermoplastics, engineering thermoplastics, or thermosetting plastics. Thus, the polymeric hydrodynamic bearings 24, 26 are effective at avoiding any issues related to electric static or discharge that can otherwise damage the bearings and cause premature failure of the bearings.

Figure 2:
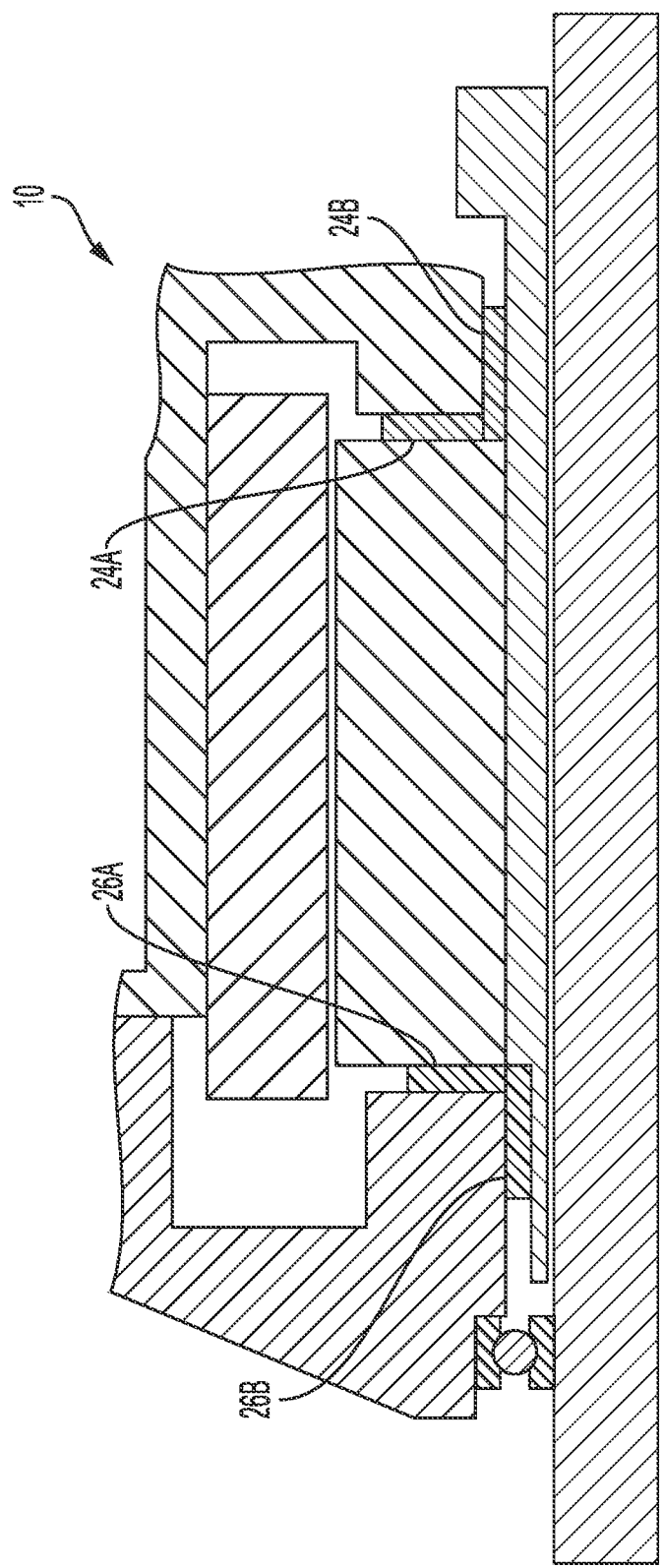
FIG. 2 is a magnified side cross-sectional view of a transmission according to another aspect in which the hydrodynamic bearing includes a separately formed radial bearing and a separately formed axial or thrust bearing.
Figure 3B:
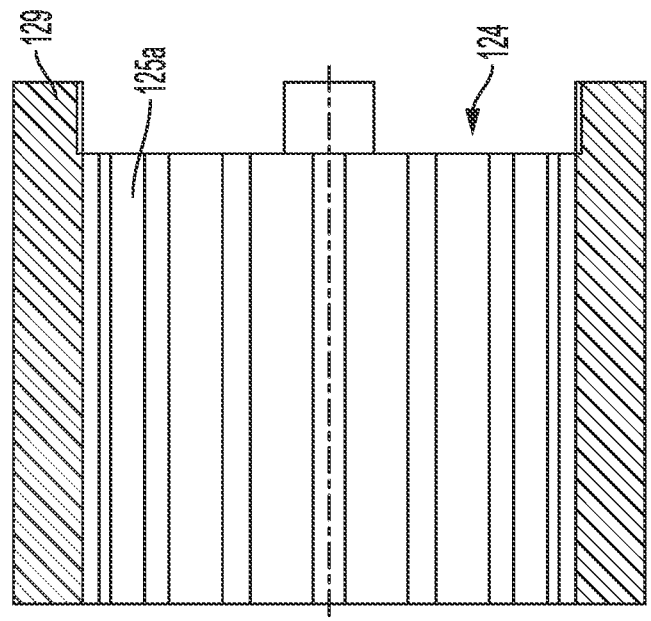
FIG. 3B is a side cross-sectional view of the hydrodynamic bearing of FIG. 3A.
Figure 3A:
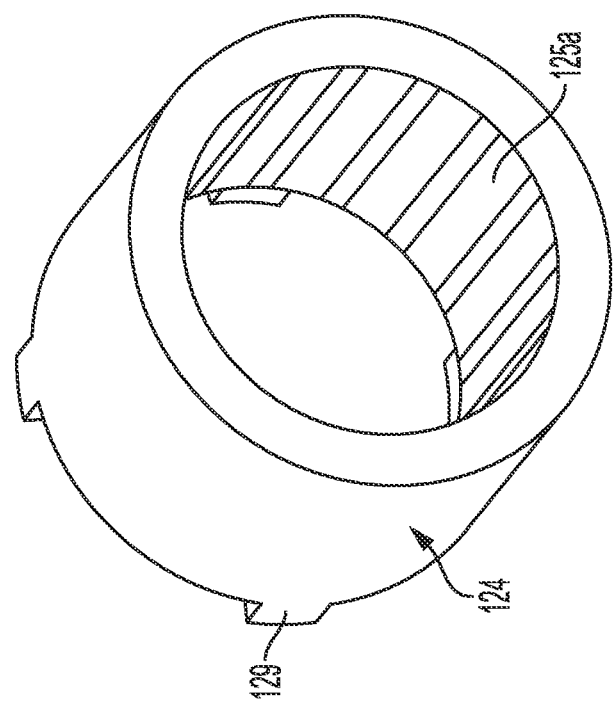
FIG. 3A is a perspective view of a hydrodynamic bearing according to one aspect.
Figure 3D:
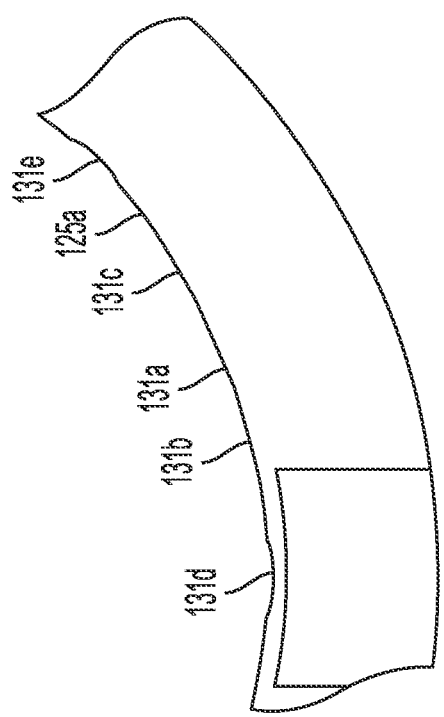
FIG. 3D is a magnified view of a portion of the bearing surface of the hydrodynamic bearing of FIGS. 3A-3C.
Figure 3C:
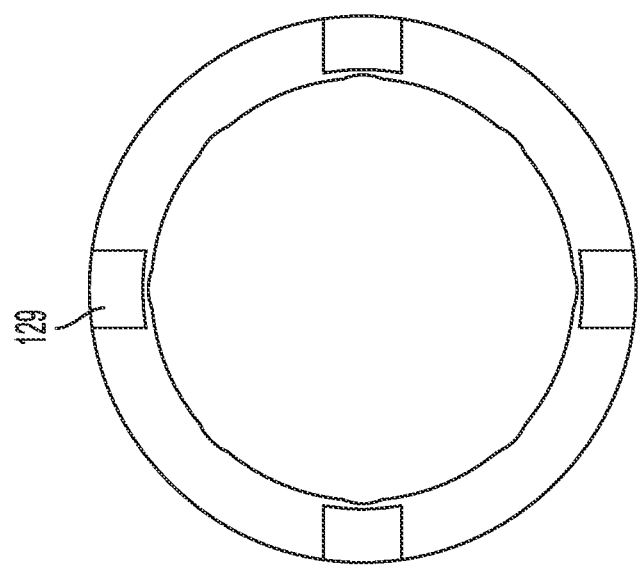
FIG. 3C is an axial planar view of the hydrodynamic bearing of FIGS. 3A and 3B.

FIG. 2 shows an alternate embodiment for the hydrodynamic bearings. In FIG. 2, the hydrodynamic bearings 24A, 24B, 26A, 26B are not a combination bearing, and instead are formed as two separate bearing elements, i.e. a radial bearing element 24B, 26B and an axial bearing element 24A, 26A. The hydrodynamic surfaces and bearing interfaces are otherwise the same as described with respect to FIGS. 1A and 1B. As shown in FIG. 2, a separate axial or thrust hydrodynamic bearing 24A and a separate radial hydrodynamic bearing 24B are provided on one axial end of the rotor shaft 22. Similarly, a separate axial or thrust hydrodynamic bearing 26A and a separate radial hydrodynamic bearing 26B are provided on the opposite axial end of the rotor shaft 22. One of ordinary skill in the art would understand that in some arrangements, a hybrid hydrodynamic bearing could be used on one end of the rotor shaft 22 and a separate pair of an axial or thrust hydrodynamic bearing and a radial hydrodynamic bearing could be used on the other end of the rotor shaft 22.

The hydrodynamic bearing disclosed herein can generally be configured to create a load-carrying oil film between support or opposing surfaces of the hydrodynamic bearing and an adjacent component, such as an interface with the rotor 20 and rotor shaft 22. During rotational operation, oil, or any other lubricating fluid, is fed into the contact between surfaces of the hydrodynamic bearing 24, 26 and the opposing surfaces of the rotor 20 and rotor shaft 22 to create a wedge-shaped thrust-load carrying oil film and also a wedge-shaped radial-load carrying oil film.

Various support surfaces of the hydrodynamic bearings 24, 26 can vary and include various profiles. As shown in FIGS. 3A-3D, one type of hydrodynamic bearing 124 is provided that includes a radial bearing surface 125a. The hydrodynamic bearing 124 can also include anti-rotation elements, such as protrusions 129.

The radial bearing surface 125a of the hydrodynamic bearing 124 of FIGS. 3A-3D has a profile including a repeating pattern of flat section 131a, ramped sections 131b, 131c on opposite sides of the flat section 131a, and groove sections 131d, 131e arranged on opposite ends of respective ones of the ramped sections 131b, 131c. The ramped sections 131b, 131c are ramped in opposite directions from each other, in one aspect. The ramped sections 131b, 131c have a flat but angled profile, while the groove sections 131d, 131e have a continuously curved profile. The ramped sections 131b, 131c of the bearing surface can be angled relative to the adjacent flat section 131a by an angle of 0.25 to 3 degrees.

The hydrodynamic bearing 124 shown in FIGS. 3A-3D can be formed as a radial bearing and does not include an axial or thrust bearing feature. One of ordinary skill in the art would understand that an axial end of the hydrodynamic bearing 124 can include bearing surfaces that may include profiles similar to the profile provided on the radial bearing surface 125a.

The hydrodynamic bearing 124 of FIGS. 3A-3D can be implemented into the transmission 10 assembly shown in FIG. 2 where hydrodynamic bearings 24B, 26B are illustrated in FIG. 2. One of ordinary skill in the art would understand that the hydrodynamic bearing 124 could be used in conjunction with a separately formed axial or thrust hydrodynamic bearing.

Figure 4B:
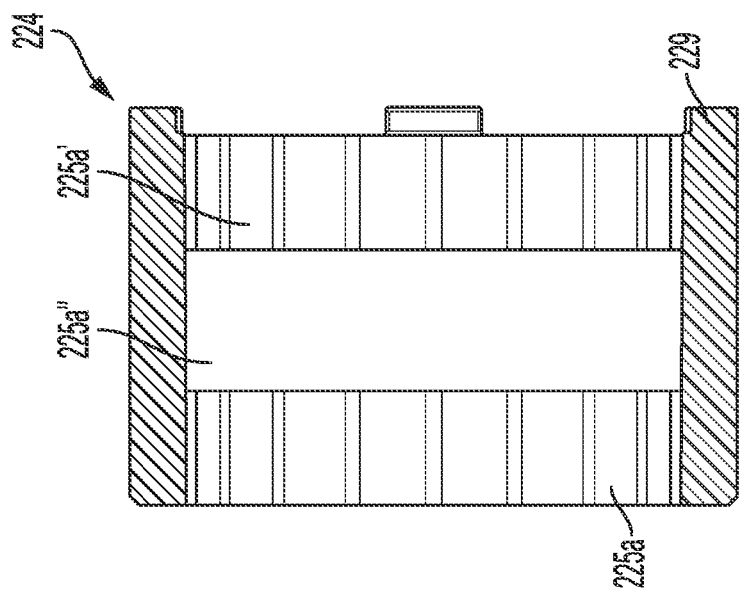
FIG. 4B is a cross-sectional view of the hydrodynamic bearing of FIG. 4A.
Figure 4A:
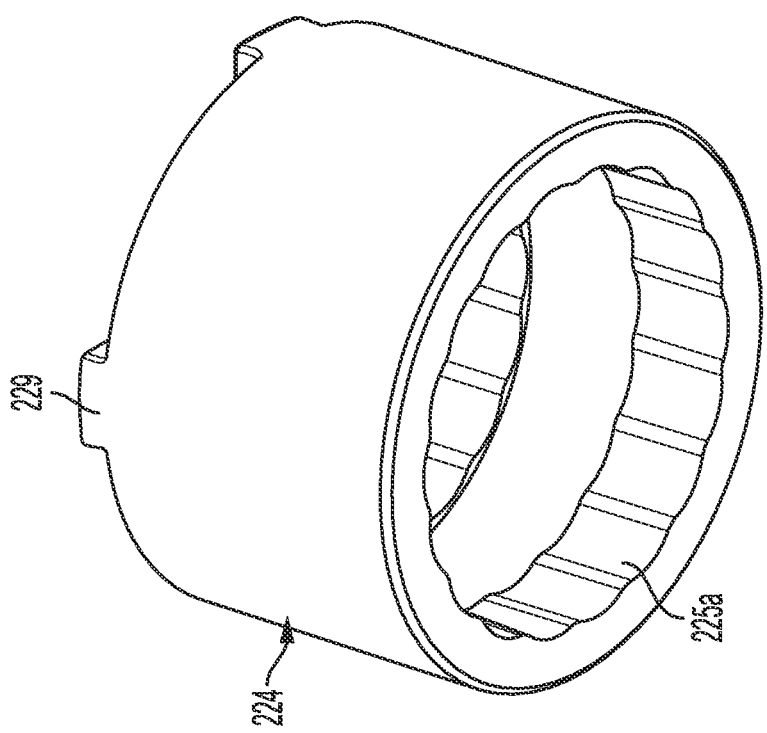
FIG. 4A is a perspective view of a hydrodynamic bearing according to another aspect.
Figure 4D:
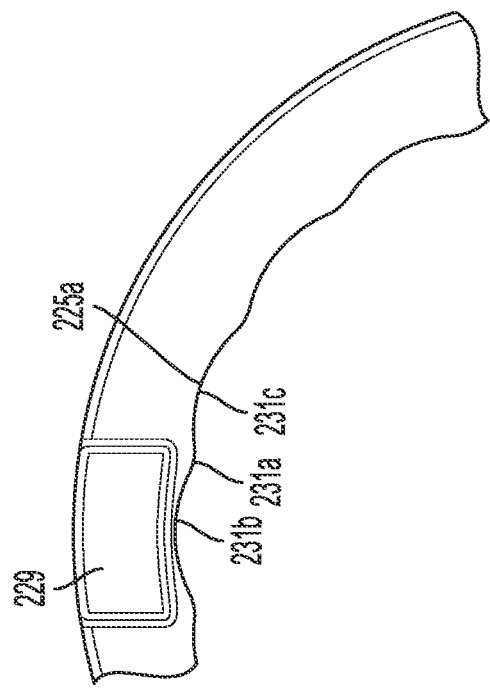
FIG. 4D is a magnified view of a portion of the bearing surface of the hydrodynamic bearing of FIGS. 4A-4C.
Figure 4C:
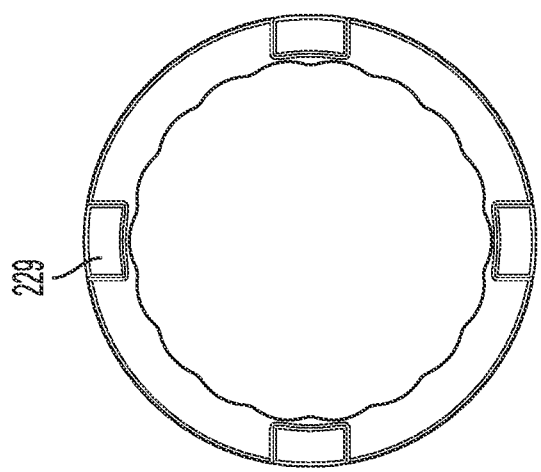
FIG. 4C is an axial planar view of the hydrodynamic bearing of FIGS. 4A and 4B.

FIGS. 4A-4D illustrate another hydrodynamic bearing 224. The hydrodynamic bearing 224 can also include anti-rotation elements, such as protrusions 229. The hydrodynamic bearing 224 includes at least one radial bearing surface 225a. As shown in FIGS. 4A and 4B, the at least one radial bearing surface 225a includes two radial bearing surfaces 225a, 225a' that are axially separated by a flat support surface 225a". For applications requiring rotational speeds upwards of 25000 rpm and reduced radial load, the radial working surface area is reduced by the flat support surface 225a" to optimize frictional losses thereby helping achieve higher rotational speeds.

The radial bearing surfaces 225a, 225a' can have a profile including a flat section 231a with groove sections 231b, 231c on opposite sides of the flat section 231a. The groove sections 231b, 231c each have a continuously curved profile or surface. This profile can repeat around a circumference of the radial bearing surfaces 225a, 225a'.

The hydrodynamic bearing 224 shown in FIGS. 4A-4D can be formed as a radial bearing and does not include an axial or thrust bearing feature. One of ordinary skill in the art would understand that an axial end of the hydrodynamic bearing 224 can include bearing surfaces that may include profiles similar to the profile provided on the radial bearing surface 225a, 225a'.

The hydrodynamic bearing 224 of FIGS. 4A-4D can be implemented into the transmission 10 assembly shown in FIG. 2 and be implemented where hydrodynamic bearings 24B, 26B are illustrated in FIG. 2. One of ordinary skill in the art would understand that the hydrodynamic bearing 224 could be used in conjunction with a separately formed axial or thrust hydrodynamic bearing.

Figure 5B:
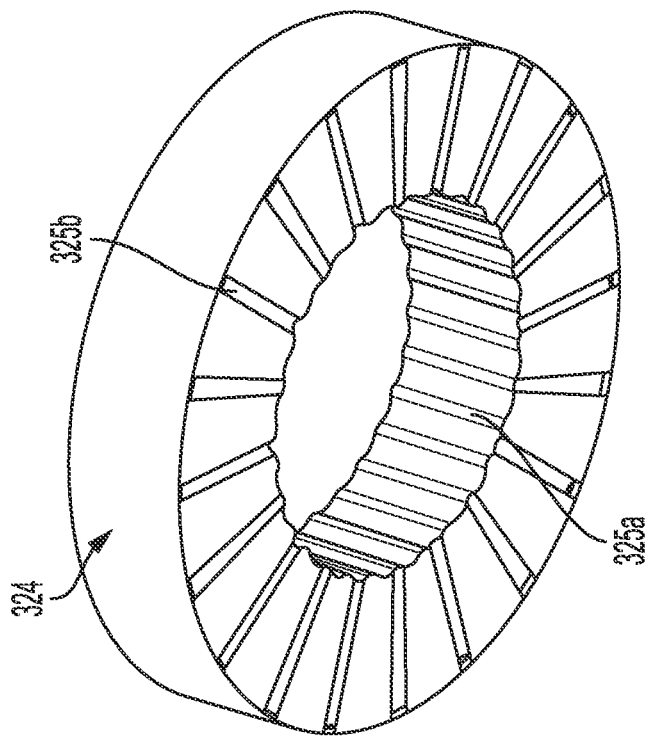
FIG. 5B is a perspective view of the hydrodynamic bearing of FIG. 5A.
Figure 5A:
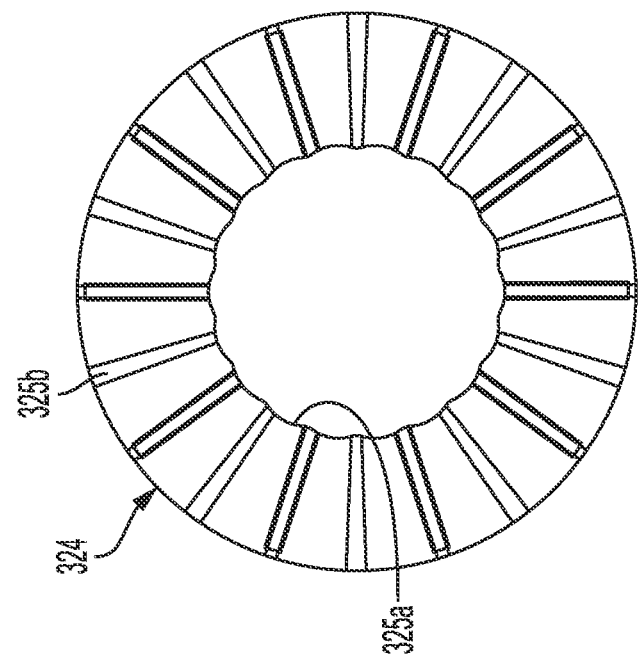
FIG. 5A is a front axial planar view of a hydrodynamic bearing according to another aspect.
Figure 5E:
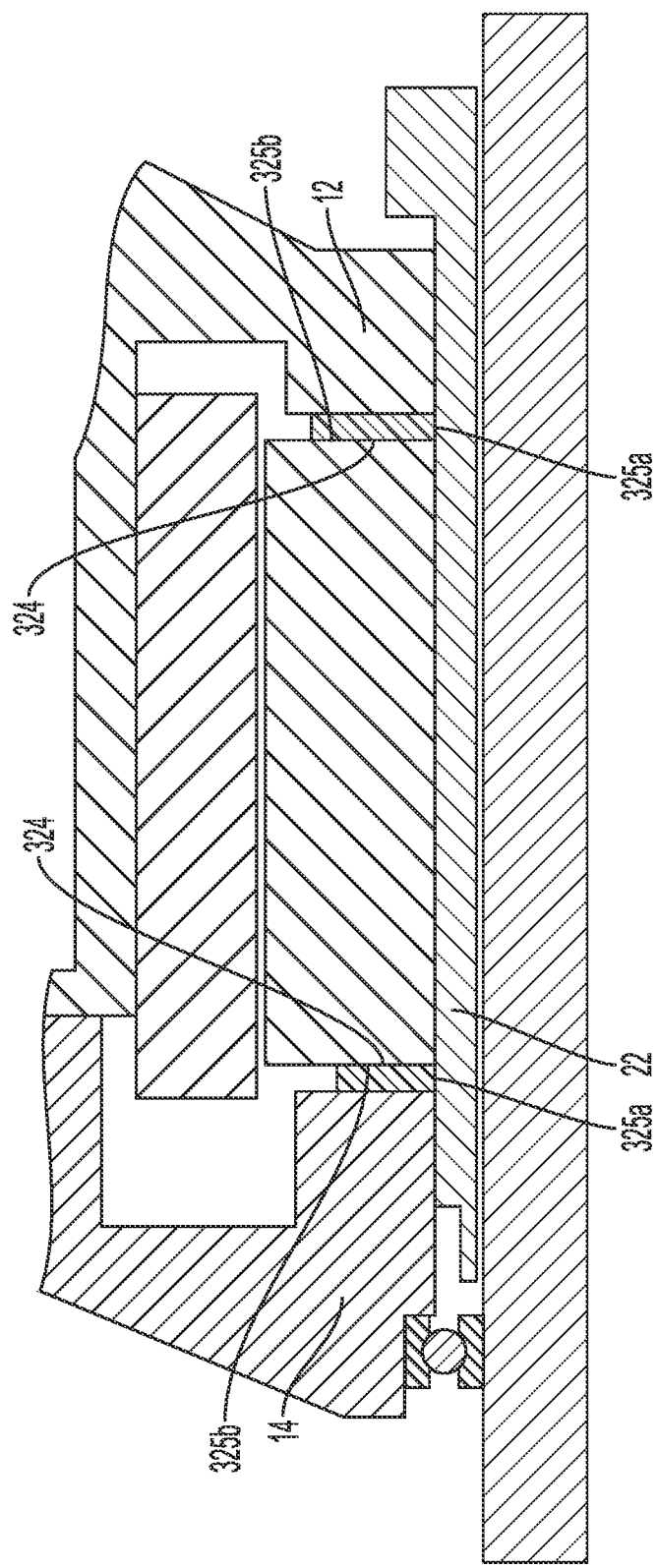
FIG. 5E is a cross-sectional view showing an interface between the hydrodynamic bearing of FIGS. 5A-5D and other components of the transmission.

FIGS. 5A-5E illustrate another hydrodynamic bearing 324 that includes both a radial bearing surface 325a and an axial or thrust bearing surface 325b. In this aspect, the hydrodynamic bearing 324 is a combination bearing. As shown in FIGS. 5A-5E, the hydrodynamic bearing 324 does not include an anti-rotation element or feature. One of ordinary skill in the art would understand that an anti-rotation element or feature could be included on the hydrodynamic bearing 324. FIG. 5E illustrates two of the hydrodynamic bearings 324 implemented into the transmission.

The radial bearing surface 325a can have a profile including a flat section 331a with groove sections 331b, 331c on opposite sides of the flat section 331a. The groove sections 331b, 331c have a continuously curved profile or surface, in one aspect. This profile can repeat around a circumference of the radial bearing surface 325a. The axial bearing surface 325b can include a profile having a flat section 333a with ramped sections 333b, 333c on opposite ends of the flat section 333a. Respective groove sections 333d, 333e are arranged on respective opposite ends of the ramped sections 333b, 333c. The ramped sections 333b, 333c can have a flat but angled surface or profile. The groove sections 333d, 333e can have a continuously curved surface or profile. The ramped sections 333b, 333c of the bearing surface 325b can be angled relative to the adjacent flat section 333a by an angle of 0.25 to 3 degrees.

Figure 6B:
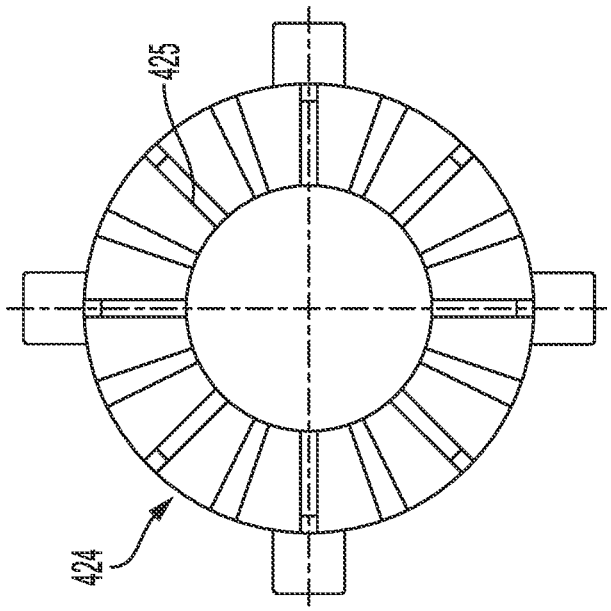
FIG. 6B is an axial planar view of the hydrodynamic bearing of FIG. 6A.
Figure 6A:
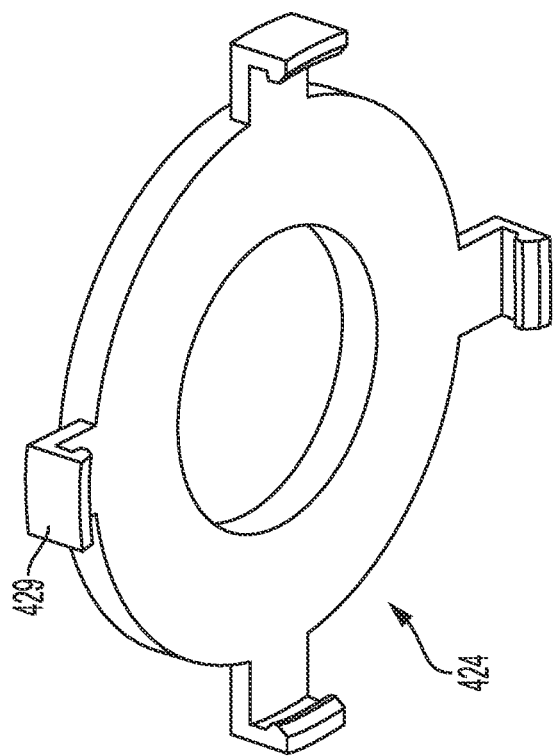
FIG. 6A is a perspective view of a hydrodynamic bearing according to another aspect.
Figure 6C:
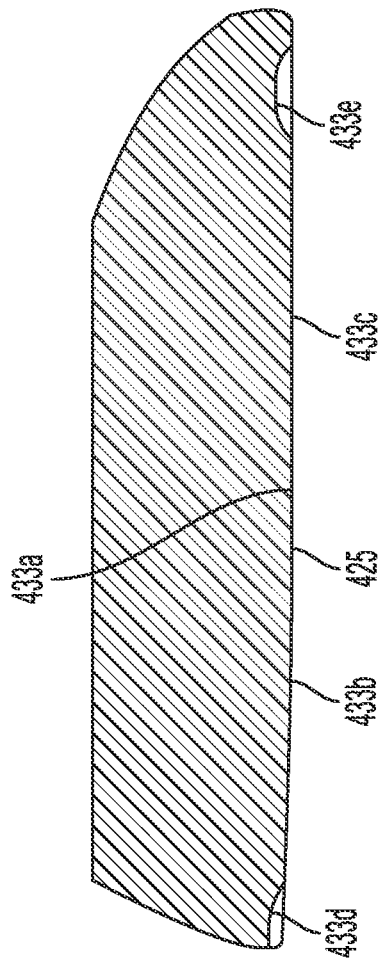
FIG. 6C is a magnified view of a portion of one bearing surface of the hydrodynamic bearing of FIGS. 6A and 6B.

FIGS. 6A-6C illustrate another hydrodynamic bearing 424. The hydrodynamic bearing 424 is an axial or thrust bearing, in one aspect. The hydrodynamic bearing 424 includes anti-rotation elements, such as protrusions 429. The hydrodynamic bearing 424 includes at least one axial bearing surface 425 defining a bearing profile. The bearing profile is shown in FIG. 6C. The axial bearing surface 425 can include a profile having a flat section 433a with ramped sections 433b, 433c on opposite ends of the flat section 433a. Respective groove sections 433d, 433e are arranged on respective opposite ends of the ramped sections 433b, 433c. The ramped sections 433b, 433c can have a flat but angled surface or profile. The groove sections 433d, 433e can have a continuously curved surface or profile. The ramped sections 433b, 433c of the bearing surface 425 can be angled relative to the adjacent flat section 433a by an angle of 0.25 to 3 degrees.

The bearing surface features disclosed in any one of the Figures, such as FIGS. 3A-3D, 4A-4D, 5A-5D, and 6A-6C, can be implemented or included with any one or more of the hydrodynamic bearings 24, 26, 24A, 24B, 124, 224, 324, 424.

In one aspect, the hydrodynamic bearings disclosed herein are high speed bi-directional bearings, which may be either radial only, axial only, or combination radial and axial bearings. As used in this document, the term high speed means upwards of 15,000 rpm. The hydrodynamic bearings operate under the principle of providing wedge-shaped oil film that help support radial or axial loads in a desired direction based on the rotational direction and speed between the adjacent components supported by the hydrodynamic bearing.

In each of the embodiments disclosed herein, the hydrodynamic bearings including bearing surfaces with a specific groove geometry or profile. The bearing surfaces of each of the hydrodynamic bearings are oriented facing the rotor 20 and/or rotor shaft 22. The hydrodynamic bearings in each embodiment can either be press-fit onto one of the components of the outer housing 11, or can be locked into place with the components of the outer housing 11 via anti-rotation features.

The present disclosure is directed to an arrangement which prevents premature failure of bearings used in high speed E-motors from the passage of electric current through the bearings without the need for any insulation coatings or other shunt options which are otherwise required to prevent the passage of current through the bearing. The present disclosure also eliminates the need for high speed cage and rolling elements which are expensive and/or complex to fabricate. The present arrangement eliminates the need for high precision inner and outer raceways which are otherwise required for proper functioning of a rolling element bearing at high speeds. The present configuration also helps improve noise, vibration, and harshness (NVH) levels. By using hydrodynamic bearings that are formed from non-conductive materials, such as polymers or plastics, the present disclosure ensures that undesirable and damaging electrical current does not pass through the bearing elements.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS transmission 10
Outer housing 11
central housing 12
first end cap 14
second end cap 16
stator 18
rotor 20
axial end face 20a of the rotor
axial end face 20b of the rotor
rotor shaft 22
first end 22a of rotor shaft
second end 22b of rotor shaft
radial surface 22c of the rotor shaft
first hydrodynamic bearing 24
axial bearing element 24A
radial bearing element 24B
outer radial surface 25a of the first hydrodynamic bearing
inner radial surface 25b of the first hydrodynamic bearing
outer axial surface 25c of the first hydrodynamic bearing
inner axial surface 25d of the first hydrodynamic bearing
second hydrodynamic bearing 26
axial bearing element 26A
radial bearing element 26B
outer radial surface 27a of the second hydrodynamic bearing
inner radial surface 27b of the second hydrodynamic bearing
outer axial surface 27c of the second hydrodynamic bearing
inner axial surface 27d of the second hydrodynamic bearing
differential 28
first output shaft 30
first end 30a of first output shaft
second end 30b of first output shaft
second output shaft 32
carrier 34
bearing 36
bearing 38
bearing 40
bearing 42
countershaft 44
bearings 46
bearings 48
first gear 50
second gear 52
third gear 54
fourth gear 56
radial support surface 60 of the central housing
radial support surface 62 of the first end cap
hydrodynamic bearing 124, 224, 324, 424
radial bearing surface 125a, 225a, 225a', 325a
flat support surface 225a"
anti-rotation elements 129, 229, 429
flat section 131a, 231a, 331a, 333a, 433a
ramped sections 131b, 131c, 333b, 333c, 433b, 433c
groove sections 131d, 131e, 231b, 231c, 331b, 331c, 333d, 333e, 433d, 433e
axial bearing surface 325b, 425

What is claimed is:

1. An electric transmission assembly comprising:
a stator arranged inside of an outer housing;
a rotor configured to be rotatably driven by the stator, the rotor including a rotor shaft; and
at least one hydrodynamic bearing arranged between the rotor shaft and the outer housing, and the at least one hydrodynamic bearing is formed from a non-metallic material, the at least one hydrodynamic bearing comprising:
a radially extending flange defining a first bearing surface, the radially extending flange including an outer radial surface engaging the outer housing, and an inner radial surface engaging a radial surface of the rotor shaft; and
an axially extending flange defining a second bearing surface, the axially extending flange including an outer axial surface engaging the outer housing, and an inner axial surface engaging an axial end face of the rotor.

2. The electric transmission assembly according to claim 1, wherein the at least one hydrodynamic bearing is formed from a polymeric or plastic material.

3. The electric transmission assembly according to claim 1, wherein the at least one hydrodynamic bearing includes a first hydrodynamic bearing at a first axial end of the rotor, and a second hydrodynamic bearing at a second axial end of the rotor.

4. The electric transmission assembly according to claim 3, wherein the first hydrodynamic bearing is configured to engage a first section of the outer housing, and the second hydrodynamic bearing is configured to engage with a second section of the outer housing.

5. The electric transmission assembly according to claim 1, wherein the radially extending flange and the axially extending flange are integrally formed with each other.

6. The electric transmission assembly according to claim 1, wherein the radially extending flange and the axially extending flange are separately formed from each other.

7. The electric transmission assembly according to claim 1, wherein the at least one hydrodynamic bearing includes an anti-rotation element configured to rotationally fix the at least one hydrodynamic bearing to another component of the transmission.

8. The electric transmission assembly according to claim 1, wherein the at least one hydrodynamic bearing includes at least one bearing surface on at least one of a radial bearing surface or an axial bearing surface having a profile comprising a flat section with groove sections on either end of the flat section, wherein the profile repeats around a circumference of the at least one bearing surface.

9. The electric transmission assembly according to claim 1, wherein the at least one hydrodynamic bearing includes at least one bearing surface on at least one of a radial bearing surface or an axial bearing surface having a profile comprising a flat section with ramped sections on either end of the flat section, and groove sections on respective ends of the ramped sections, wherein the profile repeats around a circumference of the at least one bearing surface.

10. The electric transmission assembly according to claim 1, wherein the rotor shaft has a first gear configured to driveably engage with a differential.

11. The electric transmission assembly according to claim 10, wherein the differential is configured to engage a first output shaft and a second output shaft, the first output shaft and the second output shaft each being configured to drive a vehicle wheel.

12. The electric transmission assembly according to claim 11, wherein the rotor shaft includes a central cavity dimensioned to receive at least one of the first output shaft or the second output shaft therein.

13. The electric transmission assembly according to claim 10, wherein the first gear is configured to engage with a second gear connected to a countershaft, the countershaft including a third gear configured to engage with a fourth gear connected to the differential.

14. The electric transmission assembly according to claim 13, wherein the countershaft is arranged offset from the rotor shaft and along a parallel axis to an axis of the rotor shaft.

15. The electric transmission assembly according to claim 13, wherein the countershaft is arranged radially outward from the differential.

16. An electric transmission assembly comprising:
a stator arranged inside of an outer housing;
a rotor configured to be rotatably driven by the stator, the rotor including a rotor shaft;
at least one hydrodynamic bearing arranged between the rotor shaft and the outer housing, the least one hydrodynamic bearing being formed from a polymeric or plastic material, the at least one hydrodynamic bearing comprising an anti-rotation element axially extending from an end face of the at least one hydrodynamic bearing, the anti-rotation element is configured to rotationally fix the at least one hydrodynamic bearing to the outer housing; and
a differential configured to be drivingly engaged by the rotor shaft via a plurality of intermediary gears.

17. The electric transmission assembly according to claim 16, wherein the rotor shaft includes a central cavity dimensioned to receive at least one of a first output shaft or a second output shaft of the differential therein.

18. The electric transmission assembly according to claim 16, wherein the at least one hydrodynamic bearing includes a first hydrodynamic bearing at a first axial end of the rotor, and a second hydrodynamic bearing at a second axial end of the rotor, wherein the first hydrodynamic bearing is rotationally secured to a first section of the outer housing, and the second hydrodynamic bearing is rotationally secured to a second section of the outer housing.

19. The electric transmission assembly according to claim 16, wherein the at least one hydrodynamic bearing includes a first hydrodynamic bearing at a first axial end of the rotor, and a second hydrodynamic bearing at a second axial end of the rotor.

* * * * *